Figure 5:
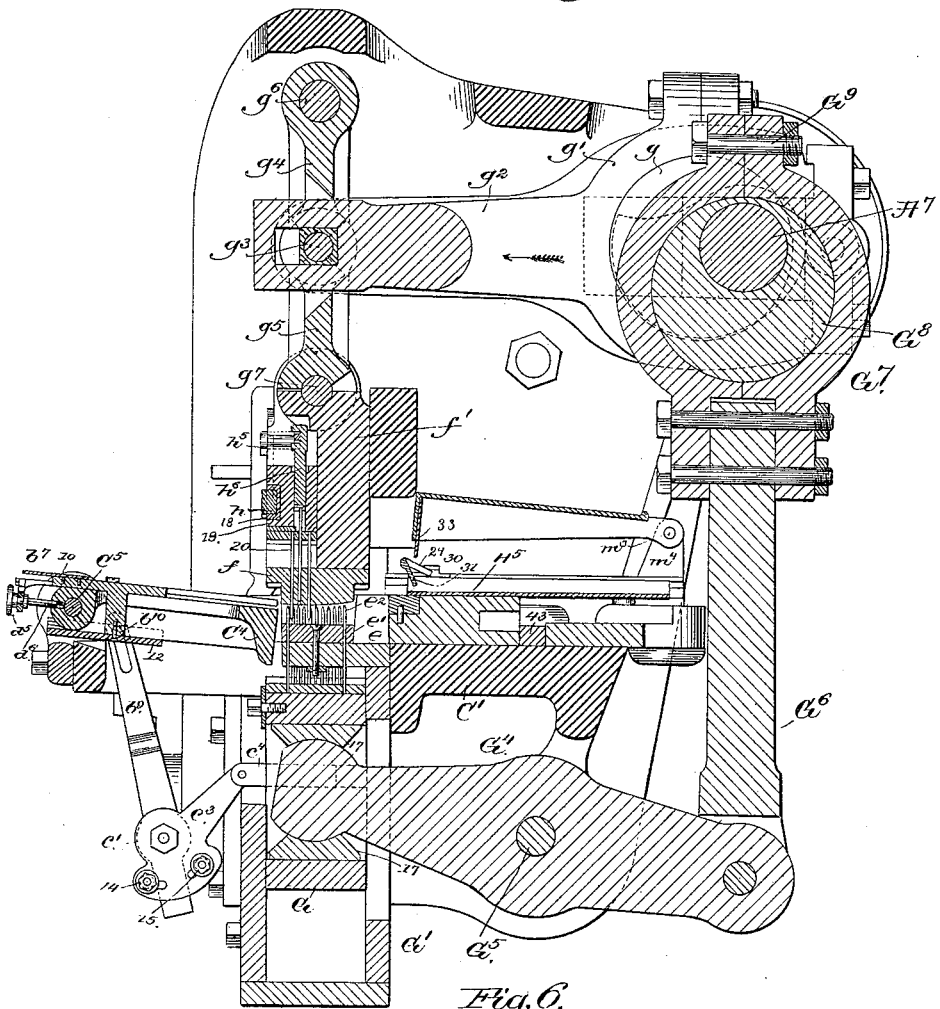

(No Model.) 8 Sheets—Sheet 1.
C. W. GLIDDEN.
HEEL MAKING MACHINE.
No. 350,051. Patented Sept. 28, 1886.
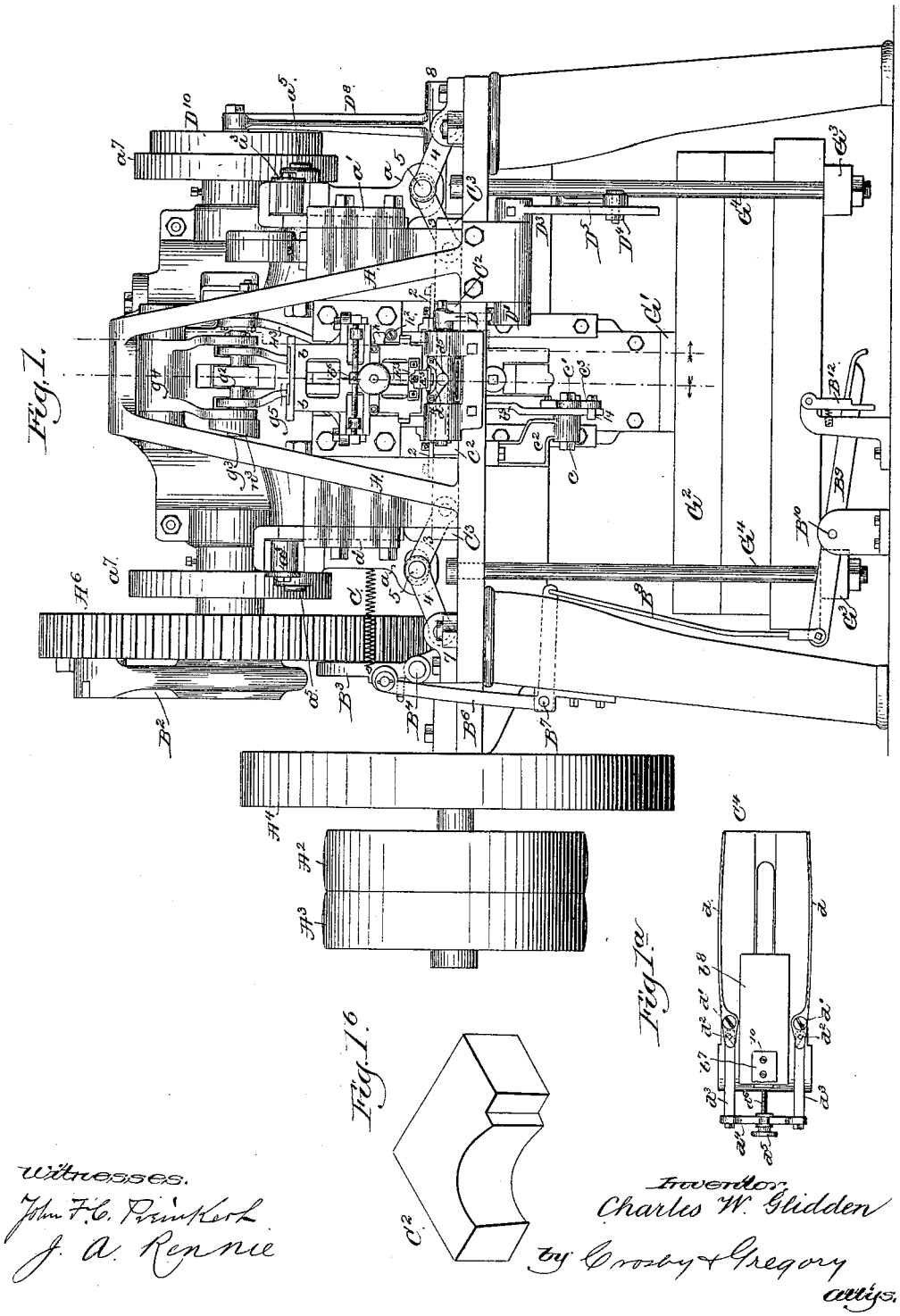
Witnesses.
John F. C. Prinkerk
J. A. Rennie
Inventor
Charles W. Glidden
by Crosby & Gregory
attys.

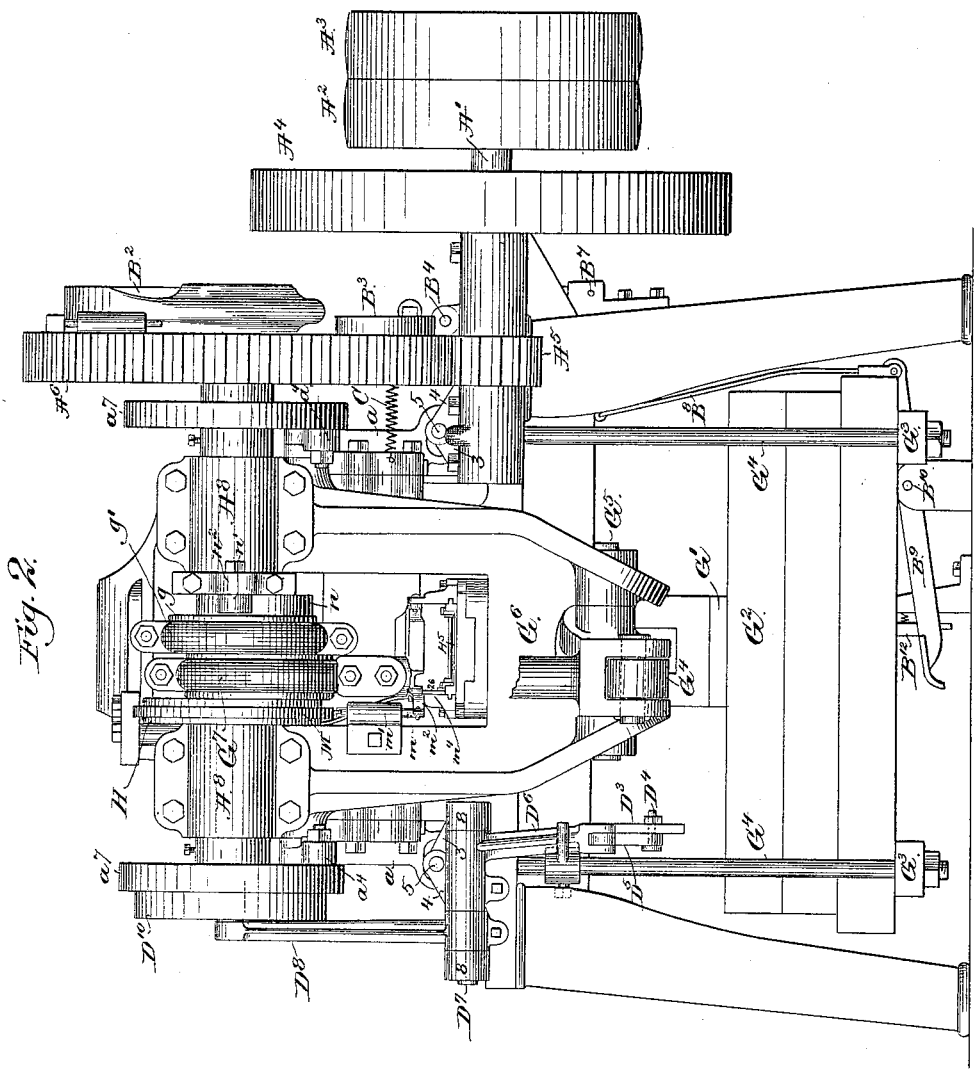

(No Model.) 8 Sheets—Sheet 3.
C. W. GLIDDEN.
HEEL MAKING MACHINE.
No. 350,051. Patented Sept. 28, 1886.
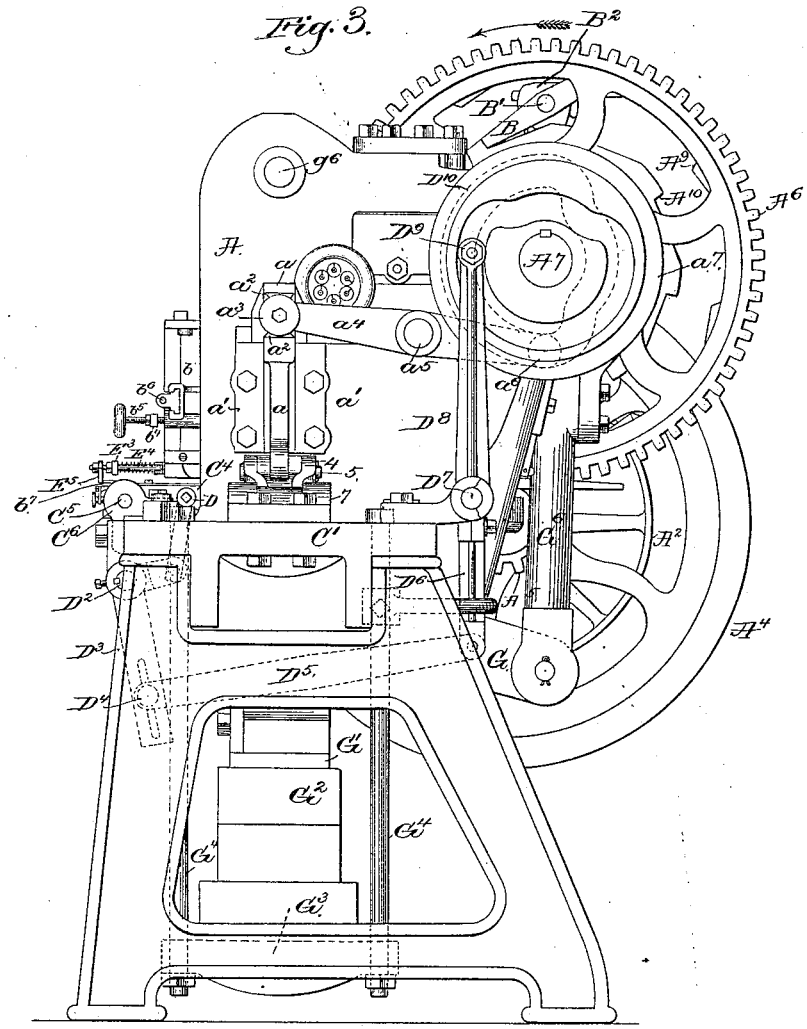
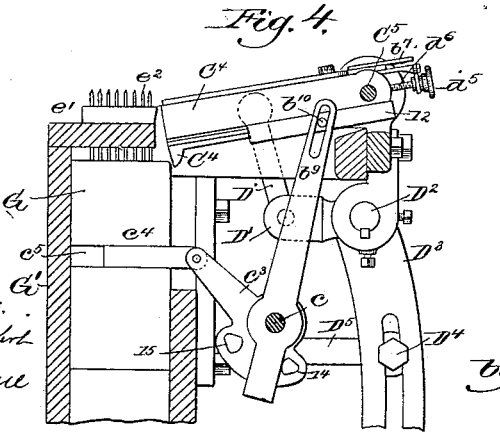
Witnesses.
John F. C. Prinkert
J. A. Rennie
Inventor.
Charles W. Glidden
by Crosby & Gregory
attys.
N. PETERS. Photo-Lithographer, Washington, D. C.

(No Model.) 8 Sheets—Sheet 4.

C. W. GLIDDEN.
HEEL MAKING MACHINE.

No. 350,051. Patented Sept. 28, 1886.

Witnesses.
John F. C. Printlock
J. A. Rennie.

Inventor:
Charles W. Glidden
by Crosby Gregory
attys.

(No Model.)  8 Sheets—Sheet 5.
C. W. GLIDDEN.
HEEL MAKING MACHINE.

No. 350,051. Patented Sept. 28, 1886.

Witnesses,
John F. C. Preinkerl
J. A. Rennie

Inventor,
Charles W. Glidden
by Crosby & Gregory
attys (No Model.) 8 Sheets—Sheet 6.
C. W. GLIDDEN.
HEEL MAKING MACHINE.
No. 350,051. Patented Sept. 28, 1886.
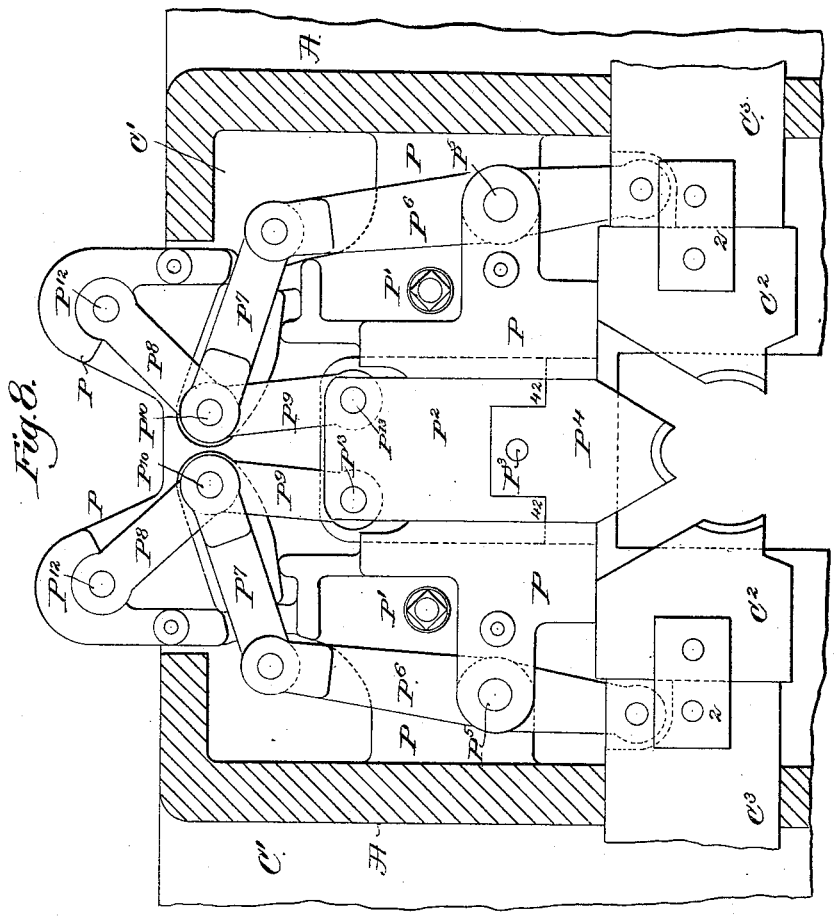

(No Model.)  
8 Sheets—Sheet 7.

C. W. GLIDDEN.
HEEL MAKING MACHINE.

No. 350,051. Patented Sept. 28, 1886.

Witnesses.
John F. C. Prinhert
J. A. Rennie

Inventor.
Charles W. Glidden
by Crosby & Gregory
attys.

(No Model.) 8 Sheets—Sheet 8.

C. W. GLIDDEN.
HEEL MAKING MACHINE.

No. 350,051. Patented Sept. 28, 1886.

Witnesses.
John F. C. Prinkert
J. A. Rennie

Inventor.
Charles W. Glidden
by Crosby & Gregory attys.

UNITED STATES PATENT OFFICE.

CHARLES W. GLIDDEN, OF LYNN, ASSIGNOR TO JAMES W. BROOKS, TRUSTEE, OF CAMBRIDGE, MASSACHUSETTS.

HEEL-MAKING MACHINE.

SPECIFICATION forming part of Letters Patent No. 350,051, dated September 28, 1886.

Application filed August 31, 1885. Serial No. 175,736. (No model.)

*To all whom it may concern:*

Be it known that I, CHARLES W. GLIDDEN, of Lynn, county of Essex, and State of Massachusetts, have invented an Improvement in Heel-Making Machines, of which the following description, in connection with the accompanying drawings, is a specification, like letters on the drawings representing like parts.

This invention is an improvement upon the machine represented in United States Patent No. 246,945, to which reference may be had.

In this present invention the material for the heel to be compressed and then pricked is fed automatically into position between the parts of the compressing-mold, and the compressed and pricked heel is then automatically taken from the machine, thus doing away with hand-manipulating the heel.

In the machine described in the said patent the mold in which the heel is compressed is composed of two movable side pieces and a breast-piece; but in the present machine the mold shown is composed of three movable parts to co-operate with the breast-piece, thus making it possible to mold a heel having considerable under curve or pitch from top to bottom.

Herein the mechanism for operating the various parts has been materially altered to increase the speed of operation and the efficiency of the machine, and the awls of the picking mechanism have been arranged to work upward through a perforated block into the heel, the said block being so supported as to yield to variations in thickness of the heel-blank being pricked, the seat end of the said blank during the pricking operation resting against a perforated follower, which is then held fixedly or immovably in place, so that the seat end of the compressed heel-blank, whatever may be its thickness, is always at the same level. Herein the throw of the awls and of the perforated follower located at the heel-seat end of the blank are constant in extent, to always enable the awl to fully perforate the heel until their points meet the follower, which, in addition to compressing the heel, is made to form the concave seat therein.

In the machine referred to in the patent the awls descend upon and enter the tread of the heel then uppermost, and under such arrangement the heel resting upon such yielding support, if a little thicker than usual, would not be pricked entirely through the heel-seat.

To properly compress and consolidate the material of the heel requires a mechanism of great solidity, one capable of exerting a very powerful pressure; and to afford this necessary strength and power I have arranged to operate the plunger, as well as the movable parts of the mold, by means of toggles.

In the patent referred to the heel-seat end of the block is sustained upon a bed which yields as the awls penetrate the b ank, and the faces of the sides of the molds which act against the periphery of the blank taper outwardly and downwardly toward the perforated block which sustains the heel-blank as the awls act upon its opposite or tread end, and as a consequence the blank, if the lifts are a little thicker than usual, or if of harder material, is pushed, as it were, out from between the molds, and the friction of the edges of the lifts comprising the heel-blank against the edges of the side molds acts to separate the edges of the lifts.

In the machine herein to be described the heel-seat end of the blank when being pricked cannot move vertically, and the pressure upon the blank is such as to obviate any end motion bodily of the blank in the molds, and the pressure is such that the edges of the lifts are compacted closely together rather than separated, which in practice is a matter of great importance, and insures the practicability of the machine herein described.

My invention in machines for compressing and pricking heel-blanks consists in a perforated support for the tread of the heel-blank and movable mold-pieces to compress a heel-blank laterally, combined with a reciprocating plunger and follower located at the seat side of the heel-blank and adapted to compress the heel-blank in the direction of its thickness, and with a set of awls to perforate the heel-blank at its tread end, the said follower, while the pricking operation is taking place, being held fixedly or immovably to insure the uniform and complete pricking of the blanks, notwithstanding variations in thickness of the lifts or their varying hardness, as will be hereinafter described; also, in a yielding support for the tread end of the heel-blank and a reciprocating plunger having an attached convexed follower to shape the seat end of the heel-blank, combined with movable mold-pieces to compress the heel-blank laterally; also, in a machine for compressing and pricking heel-blanks, a plunger having a convexed follower to act upon and concave the seat end of the heel-blank, and means, substantially as will be described, to depress the follower to a definite point preparatory to pricking the heel-blank, combined with a yielding and perforated support for the heel-blank, movable molds to compress the heel-blank laterally, and with a series of awls and means to operate them to perforate or prick the heel-blank after compressing the same and while the follower is in its depressed position; also, in a machine for compressing heel-blanks, a support for the heel and a follower to compress the heel-blank vertically, combined with a mold composed of an independent or separate piece for the back of the heel and two separate pieces for the sides of the heel, whereby a heel having pitch and concave may be compressed laterally; also, in a machine for compressing heel-blanks, a support for a blank and movable mold-pieces to compress it laterally, and a plunger and follower to co-operate with the support to compress the heel vertically, combined with a plunger and an awl passing through the follower and acting to lift the compressed blank from between the mold-pieces; also, in a machine for compressing heel-blanks, a hopper to receive the blanks, and a blank-feeder arranged below the said hopper, and a breast-piece, combined with a support for the blank, movable mold-pieces to act upon the sides of the blank, and with a plunger and follower to co-operate with the support to compress the blank vertically; also, in a machine for compressing and pricking heel-blanks, a support for the blank, a plunger and follower, movable molds to compress the blank laterally, and awls and awl-carrier to perforate the blank, combined with a feeder to automatically present a blank in position to be compressed and pricked; also, in a machine for compressing and pricking heel-blanks, a support for the blank, a plunger and follower, movable molds to compress the blank laterally, and awls and awl-carrier to perforate the blank, combined with a feeder to automatically present a blank in position to be compressed and pricked, and with a carriage to receive the compressed and pricked blank and discharge it from the machine; also, in a support for a heel-blank, and a plunger and follower and movable mold parts to compress the heel-blank, and an awl to pick up a heel-blank and lift it above the mold-pieces, combined with a carriage to receive the compressed and pricked heel and carry it away from the follower.

Other particular features in which my invention consists will be hereinafter described, and particularly pointed out in the claims at the end of this specification.

Figure 6:
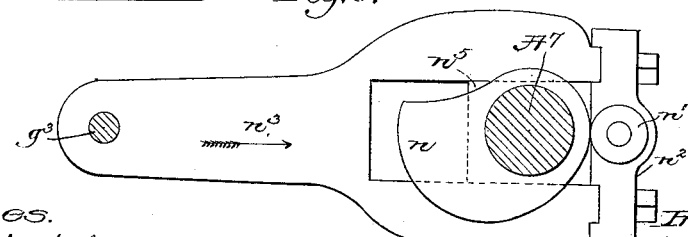
Figure 7:
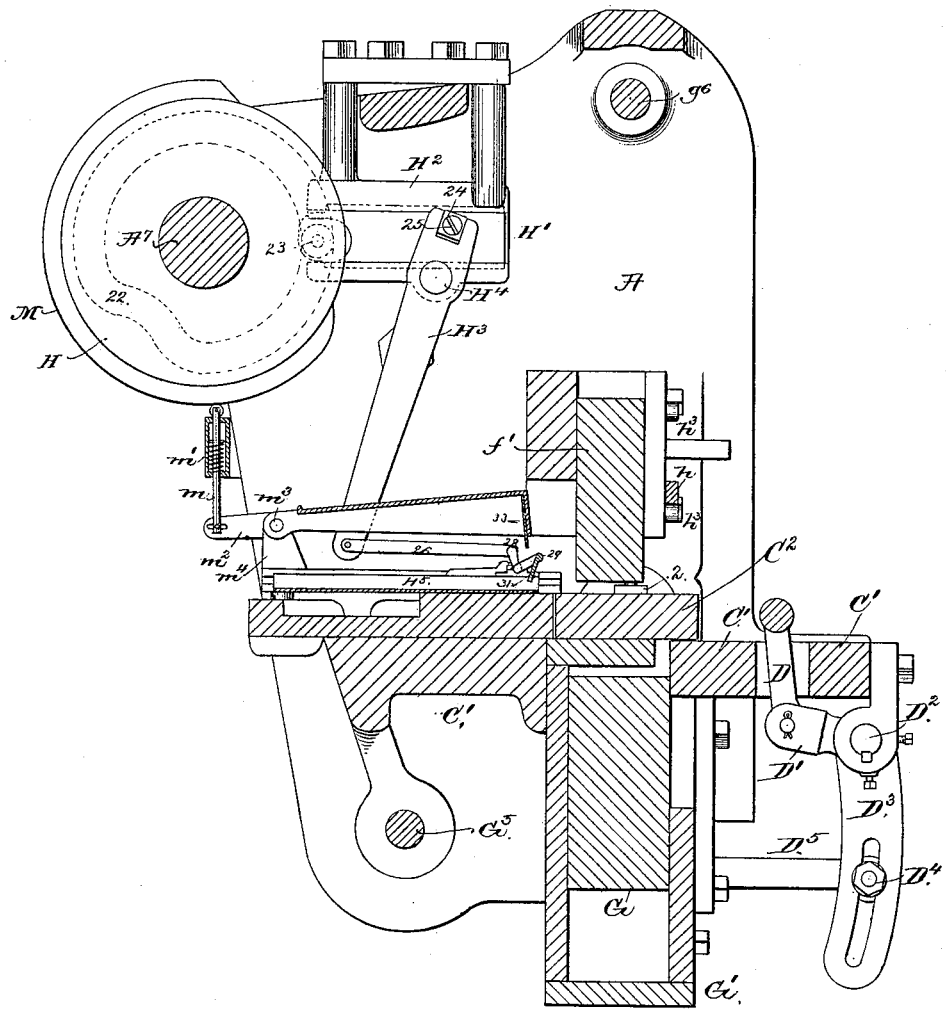
Figure 10:
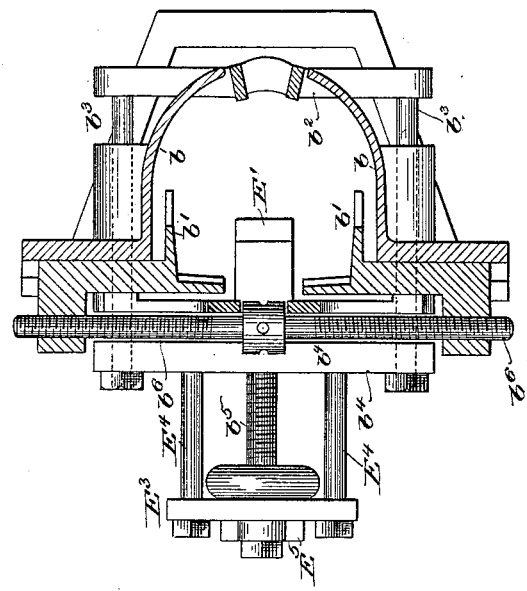
Figure 9:
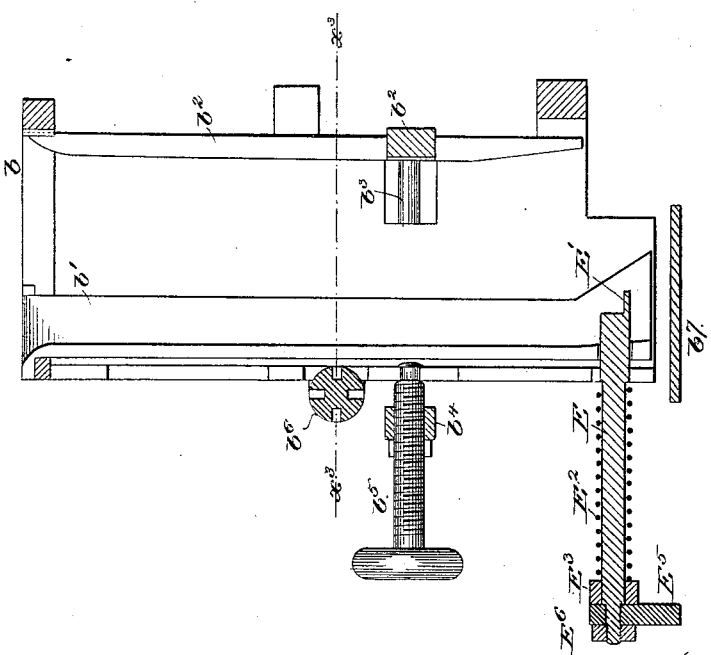
Figure 11:
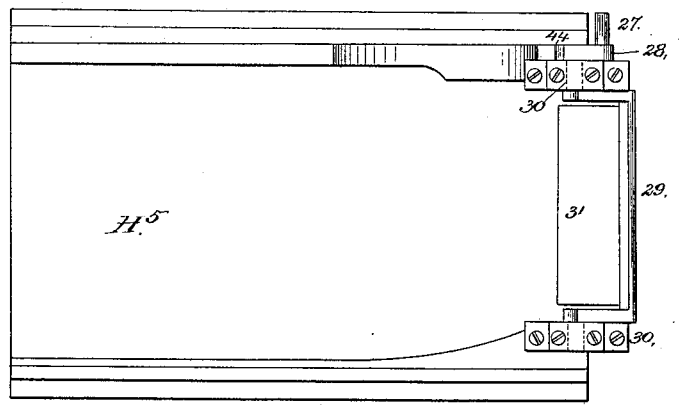
Figure 12:
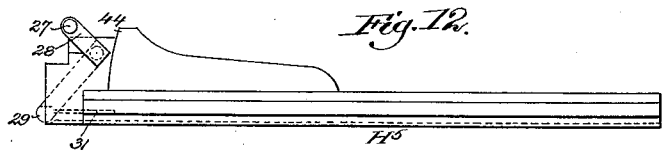
Figure 13:
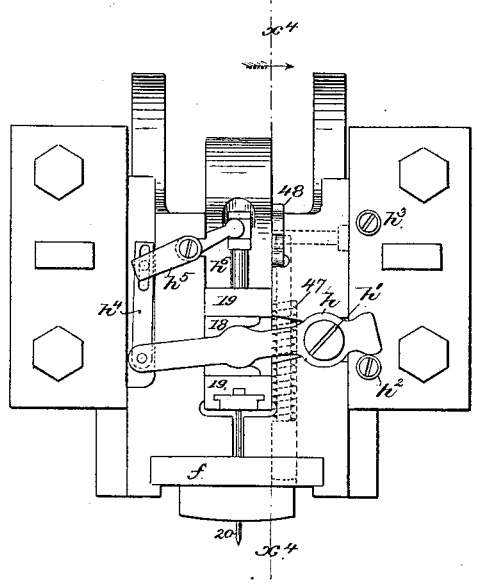
Figure 14:
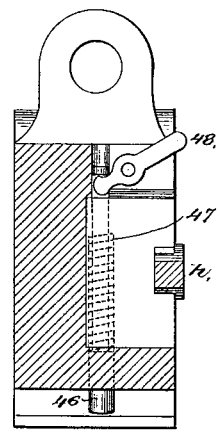

Figure 1 in front elevation represents a heel compressing and pricking machine embodying my invention. Fig. 1$^a$ is a detail to be referred to, it showing part of the heel-feeding mechanism and part of the breast-piece. Fig. 1$^b$ shows one of the movable side pieces of the mold and may be modified. Fig. 2 is a rear side view of Fig. 1. Fig. 3 is a right-hand elevation of Fig. 1. Fig. 4 is a vertical sectional detail of the blank-feeding mechanism. Fig. 5 is a vertical central section of the machine, one of the mold-pieces and the toggle-joints shown in Fig. 8 being omitted, the center stud being locked. Fig. 6 is a detail of the mechanism for accelerating the ascent of the plunger. Fig. 7 is a partial section at the right of the center of the machine, Fig. 1, chiefly to illustrate the mechanism for discharging the compressed and pricked heel. Fig. 8 is a detail, partially in section, chiefly to show in plan view the three-part mold and some of the devices for operating it. Fig. 9 is a vertical section of the blank feeder; Fig. 10, a section of Fig. 9 in the dotted line $x^3 x^3$; Fig. 11, a partial plan view, on a larger scale, of the carriage for removing the compressed and pricked heel; Fig. 12, an elevation of the rear side of Fig. 11; Fig. 13, a sectional detail showing the plunger with its attached heel-lifting pins by which to remove the heel from the mold; Fig. 14, a vertical section of Fig. 13, in the dotted line $x^4 x^4$, looking toward the right.

The frame-work A, of suitable shape to support the working parts, has bearings for the reception of the short shaft A′, which is provided with usual fast and loose pulleys, $A^2 A^3$, a fly or balance wheel, $A^4$, and a pinion, $A^5$, the latter engaging a toothed gear, $A^6$, loose on the main cam-shaft $A^7$, having suitable bearings at $A^8 A^8$. The gear $A^6$ (see Fig. 3) has ratchet-teeth $A^9 A^{10}$, the former of which are engaged by the dog B, pivoted at B′ on the dog-carrying arm $B^2$, fast on the shaft $A^7$ at one side of the gear $A^6$, whenever the said shaft is being rotated positively. This dog is under the control of a stop-shoe, $B^3$, pivoted at $B^4$, and a pin, $B^5$, on the stop-shoe is connected with a lever, $B^6$, shown as an elbow-lever pivoted at $B^7$, and joined by a link, $B^8$, with a treadle, $B^9$, pivoted at $B^{10}$, and having a projection to be engaged by a pivoted latch, $B^{12}$, whenever the treadle is depressed, the latter in depressed position holding the stop-shoe out of range of the dog, and permitting the latter to engage the teeth $A^9$ and rotate the shaft $A^7$. When the latch $B^{12}$ is released, the spring C, acting upon the stop-shoe places it in such position as to be struck by the dog B in the rotation of the gear $A^6$, thus releasing the dog from the said teeth $A^9$, and permitting the shaft $A^7$ to come to rest. The teeth $A^{10}$ are solely for the purpose of enabling the shaft $A^7$ to be rotated in the reverse of its regular rotation by hand, if that for any reason is considered necessary, the lower end of the dog B then engaging the teeth $A^{10}$. The bed $C'$ has laid upon it the sliding pieces $C^2$ of the mold. Each of these sliding pieces $C^2$ is connected, by a thin metal plate or link, 2, and suitable pins, with a slide-bar, $C^3$, held in suitable guides, so as to impart to the said parts $C^2$ movement in a right line toward each other, to act upon the sides of and compress the heel-blank laterally, and to then retire from contact with the said heel-blank after the latter has been also compressed in the direction of its thickness and pricked, as will be described.

Each slide-bar $C^3$ has jointed to it one arm, 3, of a toggle-joint, the other arm, 4, being pivoted upon a pin of an ear, 7, attached to the frame-work $C'$, the center part, 5, of the said toggle-joint entering a slot in a vertically-moving toggle-joint-actuating slide, $a$, adapted to be moved vertically in guides $a'\ a'$, the upper end of the said slide being cut out at its outer side to receive two sliding boxes, $a^2$, each concaved at one side and flat at its other side, the concaved faces of the boxes receiving between them as a fit the round end $a^3$ of a lever, $a^4$, pivoted at $a^5$, and having at its rear end a roller or other stud, $a^6$, (shown in dotted lines, Fig. 3,) the said roller or stud entering a groove (shown in dotted lines, Fig. 3) in a cam-disk, $a^7$, fast on the shaft $A^7$, there being two such cams on the said shaft—one near each end—to operate both of the mold-pieces $C^2$ separately, but in unison, in the proper time and order. The bed $C'$ at the rear of the mold parts $C^2$ has laid upon it a plate, P, which is held on the bed between the upright parts of the frame A by bolts $P'$. (See Fig. 8.) The ends of the plate P serve as guides for the inner side edges of the mold parts $C^2$, and the said plate is grooved or cut out centrally to form guides for the reception of the reciprocating slide $P^2$, with which, by pin $P^3$, is connected the part $P^4$ of the mold. The plate P has suitable pivots, $P^5$, to serve as fulcra for the levers $P^6$, attached by pivots to link $P^7$, each jointed to the center pivot, $P^{10}$, of a toggle-lever, $P^8$, composed of links $P^8\ P^9$, the latter being jointed to the slide $P^2$, while the former is pivoted upon a pin, $P^{12}$, of the plate P. The outer ends of the levers $P^6$ are jointed to the slides $C^3$, and as the latter are moved, as described, they move the said levers, and, finally, the slide $P^2$, causing the mold part $P^4$ to be opened and closed or to be moved radially in unison with the mold parts $C^2\ C^2$. When the heel-blank is being compressed laterally between the mold-pieces $C^2$, the breast of the heel-blank rests against a breast-piece, $C^4$, (see Figs. 3, 4, 5, and $1^a$,) the said breast-piece being pivoted at $C^5$ between ears of a block, $C^6$, bolted to the frame-work A. The front end of the breast-piece $C^4$ is raised to constitute the breast of the mold, and at proper times is lowered to permit the heel-blank to slide easily down along the upper inclined side of the said pivoted breast-piece from the heel-blank-holding hopper, as will be described, into position between the movable parts of the mold. This breast-piece is raised and lowered at the proper times by means of a link, D, connected with an arm, $D'$, of a rock-shaft, $D^2$, having a second arm, $D^3$, which is shown as slotted and receiving a bolt, $D^4$, extended into a link, $D^5$, which is jointed to the lower end of an arm, $D^6$, of a rock-shaft, $D^7$, held in bearings, the said rock-shaft having a second arm, $D^8$, which latter is provided with a roller or other stud, $D^9$, that enters a groove in a cam-disk, $D^{10}$.

The heel-blanks, when to be automatically fed into position between the parts of the mold described, will be placed one above the other in the hopper, which, as herein shown, is composed of a shell or frame, $b$, side pieces, $b'\ b'$, and a back piece, $b^2$, having guide-pins $b^3$, extended through bearings in the shell, (see Fig. 10,) and connected with a threaded cross-bar, $b^4$, entered by a screw, $b^5$, the inner end of which is loosely connected or socketed in the shell, the rotation of the said screw in one or the other direction, it being prevented from longitudinal movement, causing the movement of the cross-bar $b^4$ in one or the other direction to thereby move the back plate, $b^2$, to adapt it to the length of the heel-blank from its breast to its rear edge. The right-and-left-threaded screw $b^6$, entering the side pieces, $b'$, enables them to be separated or to be driven toward each other to accommodate the width of the heel-blank, the side pieces having corners to receive the square corners of the heel-blank at the breast. In its lower part the hopper has a let-off or rest, to sustain the pile of blanks, the undermost blank resting upon it. This let-off is composed of a slide-rod, E, having a lip, $E'$, (see Fig. 9,) and surrounded by a spiral spring, $E^2$, the latter being placed between a shoulder on the said rod and a cross-bar, $E^3$, held in place at its ends by studs $E^4\ E^4$, the rod E, where extended through the cross-bar, having applied to it a lug, $E^5$, and a nut, $E^6$, the said lug being acted upon at the proper times to permit the discharge of the lowermost blank by means of a projection, $b^7$, (see Figs. 3, 5, and $1^a$, the latter figure showing it partially broken off,) the said projection being attached, as herein shown, by screws 10, to the feeder $b^8$, which is a sliding plate fitted into guides in the breast-piece $C^4$ and slid therein by the slotted lever $b^9$, which engages a pin, $b^{10}$, of the bottom plate, 12, forming part of the feeder, the said projection $b^7$ being shown as in contact with the lug $E^5$ in Fig. 3 and as moving the rod E. The arm $b^9$ is held frictionally on the stud or bolt $c$ by nut $c'$ in the bracket $c^2$, the said bolt receiving upon it at one side the arm $b^9$, a tappet-lever, $c^3$, having two lugs, 14, 15, made adjustable thereon, the said lugs resting one behind the other in front of the lower part of the arm or lever $b^9$, and acting to move the said lever or arm $b^9$ when the tappet-lever is moved by the link $c^4$, which enters loosely a groove, $c^5$, cut transversely in one side of the vertically-movable awl-carrier G, (see Fig. 4), fitted to slide up and down in a guide, G', which rests against the planks $G^2$, shown as sustained by the girders $G^3$, supported by the rods $G^4$, the planks acting as springs, substantially as in the patent referred to. The distance between the lugs 14 15 is greater than the width of the arm or lever $b^9$, so as to afford a certain amount of lost motion, in order that the undermost blank of the pile may have time to fall upon the breast-piece $C^4$ in front of the feeder $b^8$ after the rod E has been withdrawn and before the feeder starts forward to carry the heel-blank down the inclined upper side of the breast-piece, which at that time is lowered. The breast-piece at its upper side, near its edge, has two guides, $d$ $d$, pivoted at $d'$, and slotted diagonally just beyond their pivoted points to receive pins $d^2$ of slides $d^3$, connected with a cross-bar, $d^4$, provided with a loose nut, $d^5$, which is screwed upon a screw, $d^6$, held at one end in the end of the breast-piece $C^4$. Rotation of the nut $d^5$ effects the adjustment of the guide-pieces $d$ to accommodate the width of the heel-blank being used. The bed-plate C' is cut out to receive the pressure-plate $e$, which rests upon the top of the guide G', the said plate sustaining the block $e'$, perforated, as is the plate, for the reception of the awls $e^2$, secured to the awl-carrier G, cut out centrally (see Fig. 5) to receive the bearing-blocks 17, which in turn receive the rounded end of the awl-carrier moving lever $G^4$, pivoted at $G^5$ and jointed to the link $G^6$, bolted to the eccentric strap $G^7$, placed about the eccentric $G^8$, fast on the shaft $A^7$, a bolt, $G^9$, holding the strap closed above the eccentric. The heel-blank acted upon by the feeder, or in other manner laid between the parts of the mold, rests at its small end on the block $e'$, which corresponds in size and shape with the size and shape desired for the compressed blank, and in such condition the end of the breast-piece is raised quickly by the devices described, and immediately thereafter the follower $f$, attached to the plunger $f'$, descends by its own gravity and rests on the heel-blank, while the mold parts $C^2$ are moved toward and to compress the heel-blank laterally, the follower at such time preventing upward bulging or tipping of the heel-blank. The lateral compression having taken effect, the eccentric $g$ in the strap $g'$ of the link $g^2$, slotted or forked at its end to receive the center pin or stud, $g^3$, of the toggle-joint $g^4$ $g^5$, turning, respectively, on the stud $g^6$, connected with the frame-work, and on the stud $g^7$, connected with the upper end of the plunger $f'$, acts to straighten the said toggle-lever and cause the follower $f$, convexed at its face, to be forced down with the full power of the machine upon and to finish the compression of the heel-blank, this latter compression being in the direction of the thickness of the blank, and also acting to concave the seat of the heel-blank previously thickened by the lateral compression of the heel-blank, it at such time being somewhat thickened at its edges. When the heel-blank is fully compressed, as stated, the awl-carrier G is lifted, as described, and the awls $e^2$ are forced up through the heel-blank, the points of the awls nearly touching the follower, regardless of the height of the heel, for the throw of the awls and the descent of the follower are always alike. The heel-blank while the awls are yet in it is released from pressure at its top and then at its sides, the awls being at the same time withdrawn. As the plunger $f'$ is given its final downward movement, the short end of the lever $h$, pivoted at $h'$ on the plunger, strikes a pin, $h^2$, on the frame and moves the said lever, so that it, by a hub-like part near its center entering a notch of a slide-block, 18, placed between the shoulders of a lifting slide, 19, provided with one or more awls, 20, causes the latter awls to be driven down into the top of the heel-blank, the said awls 20 thereafter serving to lift the heel-blank as the plunger and follower rise, the awls $e^2$ having been withdrawn; but before the plunger and follower reach their highest position the short end of the said lever $h$ meets a second fixed pin, $h^3$, which acts to lift the slide 19 to withdraw the awls 20 from the heel-blank, retracting the points of the awls 20 into the follower, and at the same time the said lever $h$, by a link, $h^4$, and lever $h^5$, acts upon and throws down an ejector, $h^6$, provided at its lower end with a stiff wire extended through the follower $f$, the ejector so made acting to detach or strike off the compressed and pricked heel-blank. As the plunger rises, and just before the compressed blank is released from below the follower, the cam-disk H, provided with a groove, 22, (see dotted lines, Fig. 7,) acts on the roller or other stud 23, and draws the slide H' back in the guideways $H^2$, causing the pivoted block 24, held on the stud 25 and placed in the fork of lever $H^3$, pivoted at $H^4$, to vibrate the said lever quickly, so that it by the link 26, pivoted to the pin 27 of the arm 28 of the crank-shaft 29, mounted in bearings 30 of the discharging-carriage $H^5$, (see Figs. 11 and 12,) and having a scraper, 31, extended rigidly therefrom in the direction best shown in Fig. 7, is quickly thrown forward from the position, Fig. 7, under the plunger, so that the heel-blank, when detached from the follower, drops on the front part of the said carriage at the rear of the scraper, which at such time is in horizontal position. The scraper 31 in Figs. 5 and 7, when the carriage is in its rearmost position, stands nearly in vertical position; but as soon as the lever $H^3$ is started to move the carriage toward the follower the link 26 turns the rock-shaft carrying the scraper into the position shown in Fig. 12 by dotted lines, the scraper when in horizontal position passing easily under the heel. The heel-blank having been dropped on the carriage $H^5$, as stated, the lever $H^3$ is moved quickly to withdraw the said carriage; but as the lever starts to move it first turns the crank-shaft into the position shown in Figs. 5 and 7, which places the scraper substantially in vertical position, so that as the carriage moves the said scraper will act against the breast of the heel, insuring its backward movement with the said carriage. The cam M, formed on the periphery of the disk H and acting on the upper end of the slide-rod $m$, placed in a guide, $m'$, and connected by pin with the lever $m^2$, pivoted at $m^3$ on a bracket, $m^4$, of the way or guide in which the carriage $H^5$ slides, holds up the forward hooked end, 33, (see Figs. 2, 5, and 7,) of the said lever, while the carriage $H^5$, with the heel-blank upon it, is being drawn back; but just as the said carriage is started forward to receive a heel-blank the depression in the cam M comes above the slide-rod and permits the lever $m^2$ to drop at its front end, so that the hooked end 33 falls sufficiently to act as a stop and prevent the movement of the heel-blank forward with the carriage, the hooked end leaving the heel-blank upon the rear end of the said carriage, the said blank being pushed off the carriage by the next blank. The link $g^2$, in its forward movement in the direction of the arrow at Fig. 5, acts upon the pin $g^3$ and turns the toggle-lever in position to exert the required maximum pressure on the heel-blank before it is pricked by the awls $e'$, and, as stated, it is desirous to slightly release the said blank from its maximum pressure before the said awls are withdrawn from the said blank. To do this the center pin, $g^3$, will be stopped just before it arrives in a line drawn through the centers $g^6$ $g^7$, so that as the eccentric $g$ commences to move the link $g^2$ in a direction opposite the arrow on it the pressure of the said link on the center pin, $g^3$, permits the said center pin to fall back, thus relaxing the pressure on the plunger before the outer end of the slot in the link $g^2$ meets the outer side of the said pin $g^3$. Releasing the extreme pressure in this way before actually lifting the plunger affords time for the awls $e$ to be withdrawn from the heel-blank. By the time that the awls $e$ are so withdrawn the link $g^2$ at the outer end of the slot which receives the center pin, $g^3$, arrives at the opposite side of the said pin to that which was acted upon by the link $g^2$ when it was moved in the direction of the arrow on it; but in this position, to increase the speed of operation of the machine, and consequently the amount of work which may be done upon it in a given time, there comes into operation an accelerating mechanism, which I will now describe. To lift the plunger $f'$ faster than it could be lifted by the eccentric $g$, I have provided an accelerating mechanism, composed, essentially, of a cam, $n$, on the shaft $A^7$, the said cam (see Figs. 5 and 6) acting upon a roller-stud, $n'$, mounted upon a cross-piece, $n^2$, securely attached to a slotted link, $n^3$, located at the left of the link $g^2$, which receives the center pin, $g^3$, of and moves the toggle-joint $g^4$ $g^5$, the said link being connected with the said center pin, $g^3$, which for such purpose is prolonged. The slotted link $n^3$ straddles a guide-block, $n^5$, loose on the shaft $A^7$. The cam $n$ acts upon the roll $n'$ and moves the link $n^3$ in the direction of the arrow thereon, Fig. 6, when the plunger is to be lifted quickly to afford ample space for the heel-carriage to be thrown quickly under the heel. As soon as the heel-carriage has received the heel-blank, and has removed the latter from the follower, the cam $n$ runs off the roll $n'$, and the plunger falls upon a second heel-blank by gravity, ready to be yet further depressed to compress the heel-blank when the link $g^2$ in its forward movement shall again strike the center pin. The employment of a three-part mold, $C^2$ $C^2$ $P^4$, enables me to compress laterally heel-blanks having very considerable pitch and concave at back and sides, and hence the employment of separate mold-pieces at the rear of the heel and separate mold-pieces at each side of the heel becomes a matter of greater importance. To enable me, however, in the present machine to compress and prick common or straight-up-and-down heel-blanks I may remove the mold-pieces $C^2$ $C^7$ $P^4$, and for the two pieces $C^2$ $C^2$ may insert mold-pieces shaped as shown in Fig. $1^b$, and in such event the pivot-pins $P^{13}$, Fig. 8, will be removed, leaving the slide $P^2$ at rest, and then, if desired, the slide may be held forward with its edges 42 in line with the end of the table next the mold-pieces $C^2$ $C^2$ by a key, 43. (Shown only in Fig. 5.) The rocking movement of the crank-shaft 29 is limited in one direction by the arm 28 striking a shoulder, 44, and in the other direction by the scraper or the shaft itself, between its bearings 30, striking the front end of the table. The follower $f$ is locked in position at the lower end of the plunger $f'$ by means of a bolt, 46, normally kept depressed by a spring, 47, and lifted by a lever, 48, when it is desired to return or insert a follower of the proper size, the follower having a hole to receive the pin, and fitting guideways at the lower end of the plunger.

I claim—

1. In a machine for compressing and pricking heel-blanks, a perforated block to act against the tread of the heel-blank and movable mold-pieces to compress the heel-blank laterally, combined with a reciprocating plunger, $f'$, and follower $f$, both located at the seat side of the heel-blank and adapted to compress the heel-blank in the direction of its thickness, and with a set of awls to perforate the heel-blank at its tread end, the said follower, while the awls are perforating the blank, being fixedly or immovably held in place, substantially as described.

2. In a machine for compressing and pricking heel-blanks, the plunger having the convexed follower to act upon and concave the seat end of the heel-blank, and means, substantially as described, to depress the follower to a definite point preparatory to pricking the heel-blank, combined with a yielding and perforated support for the heel-blank, movable molds to compress the heel-blank laterally, and with a series of awls and means to operate them to perforate or prick the heel-blank after compressing the same and while the follower is in its depressed position, substantially as described.

3. In a machine for compressing heel-blanks, a support for the blank and movable mold-pieces to compress it laterally, and a plunger and follower to co-operate with the support to compress the heel vertically, combined with a plunger and an independent blank-lifting awl passing through the follower and acting to lift the compressed blank from between the mold-pieces, substantially as described.

4. In a machine for compressing heel-blanks, a support for the blank and movable mold-pieces to compress it laterally, and a plunger and follower to co-operate with the support to compress the heel vertically, combined with a plunger and awl passing through the follower and acting to lift the compressed blank from between the mold-pieces, and with an ejector, $h^6$, to detach the heel-blank quickly from the lower end of the follower, substantially as described.

5. In a machine for compressing heel-blanks, a hopper to receive the blanks and a blank-feeder arranged below the said hopper, and a breast-piece, combined with a support for the blank, movable mold-pieces to act upon the sides of the blank, and with a plunger and follower to co-operate with the support to compress the blank vertically, substantially as described.

6. The support for the heel-blank, and the reciprocating plunger and follower, and the toggle-lever and lug $g$, to move it to operate the plunger and follower, substantially as described.

7. The support for the heel-blank, and the reciprocating plunger and follower, and the toggle-lever and lug $g$, to move it to operate the plunger and follower, and with accelerating mechanism, substantially as described, to accelerate the movement of the plunger for part of its length, substantially as described.

8. The main shaft $A^7$, its eccentric, the link $G^6$, lever $G^4$, yielding guide perforated plate $e$, and perforated support $e'$ for the heel-blank, combined with the awl-carrier G, the series of awls, and with the plunger and its follower, the said follower, while the awls penetrate the blank, being held fixedly or immovably to insure the passage of the awls entering through the blank, substantially as described.

9. A support for the heel-blank, the plunger, its attached follower, the toggle-joint link $g^2$, eccentric $g'$, shaft $A^7$, and cam $n$, combined with the link $n^3$, provided with a stud or projection, $n'$, the latter link being joined with the center pin, $g^3$, of the said toggle-lever, to operate substantially as described.

10. In a machine for compressing and pricking heel-blanks, a support for the blank, the plunger $f'$, and follower $f$, movable molds to compress the blank laterally, and awls and awl-carrier to perforate the blank, combined with blank-feeding mechanism, substantially as described, to automatically present a blank in position to be compressed and pricked, substantially as described.

11. In a machine for compressing and pricking heel-blanks, a support for the blank, a plunger and follower, movable molds to compress the blank laterally, and awls and awl-carrier to perforate the blank, combined with a feeder to automatically present a blank in position to be compressed and pricked, and with an independent carriage to receive the compressed and pricked blank and discharge it from the machine, substantially as described.

12. The support for the heel-blank, and the plunger and follower, and the movable mold parts to compress the heel-blank, and the independent awl to pick up the heel-blank and lift it above the mold-pieces, combined with an independent carriage to receive the compressed and pricked heel and carry it away from the follower, substantially as described.

13. The support for the heel-blank, and the plunger and follower, and the movable mold parts to compress the heel-blank, and the awl to pick up the heel-blank and lift it above the mold-pieces, combined with a carriage to receive the compressed and pricked heel and carry it away from the follower, and with a scraper to pass under the heel-blank during the forward movement of the carriage and to rise behind the breast of the heel as the carriage moves backward, substantially as described.

14. The support for the heel-blank, and the plunger and follower, and the movable mold parts to compress the heel-blank, and the awl to pick up the heel-blank and lift it above the mold-pieces, combined with a carriage to receive the compressed and pricked heel and carry it away from the follower, and with a scraper to pass under the heel-blank during the forward movement of the carriage and to rise behind the breast of the heel as the carriage moves backward, and with a hooked lever or stop to prevent the heel-blank from being moved forward with the said carriage, substantially as described.

15. The support for the heel and the movable mold parts, combined with the pivoted breast-piece, and with means, substantially as described, to raise and lower it.

16. The support for the heel and the movable mold parts, combined with the pivoted breast-piece, and with means, substantially as described, to raise and lower it, and with guides arranged at the top of the breast-piece to guide the blanks, substantially as described.

17. The support for the heel and the movable mold parts, combined with the pivoted breast-piece, and with means, substantially as described, to raise and lower it, and with guides arranged at the top of the breast-piece to guide the blanks, and with means, substantially as described, to move the said guides to accommodate blanks of varying width.

18. The carriage and the crank-shaft 29, mounted in bearings thereon and provided with the scraper 31, combined with a lever connected with the crank-pins 27, to operate substantially as described.

19. The shell $b$ of the hopper, combined with the movable back piece, $b^2$, and the movable side pieces, $b'$ $b'$, to contract the effective opening of the hopper to correspond with heel-blanks of different lengths, substantially as described.

20. In a heel-blank-making machine, the shell $b$ of the hopper, the rod E, and a spring to move it in one direction, and a stud or projection to actuate the said rod in opposition to the said spring, combined with a breast-piece to receive the blank discharged from the hopper, substantially as described.

21. The breast-piece and blank-feeder sliding thereon, and the lever $b^9$, combined with the lever $c^3$, having tappets 14 15, to operate substantially as described.

22. The pivoted breast-piece, the link D, the arms D′ D³, and rock-shaft, combined with the link D⁵ and means, substantially as described, to actuate it, as set forth.

23. In a heel-blank-making machine, the follower $f$, the plunger $f'$, and slide 19 thereon and its attached awl, and the lever $h$, combined with the stop $h^2$, substantially as described.

24. The follower $f$, the plunger $f'$, and slide 19 thereon, and its attached awl, and the lever $h$, combined with the stop $h^2$, and with the link $h^4$, lever $h^5$, ejector $h^6$, and stop $h^3$, substantially as described.

25. In a heel-blank-making machine, the movable mold-pieces $C^2$, their connected slides $C^3$, and the toggle-levers 3 4 to move them, combined with the slides $a$ and levers to move the said slides, substantially as described.

26. The slides $C^3$, to move the mold-pieces $C^2$, and the mold-pieces $P^4$ and the slide $P^2$, with which it is connected, combined with the levers $P^6$, and toggle-levers and links to actuate the slide $P^2$ from the slides $C^3$, substantially as described.

In testimony whereof I have signed my name to this specification in the presence of two subscribing witnesses.

CHARLES W. GLIDDEN.

Witnesses:
G. W. GREGORY,
F. P. EMERY.